(12) United States Patent
Zhu

(10) Patent No.: US 11,956,523 B2
(45) Date of Patent: Apr. 9, 2024

(54) CAMERA ASSEMBLY, ROTATING SHAFT ASSEMBLY AND LAPTOP

(71) Applicant: BEIJING XIAOMI MOBILE SOFTWARE CO., LTD., Beijing (CN)

(72) Inventor: Jianxin Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 114 days.

(21) Appl. No.: 17/585,160

(22) Filed: Jan. 26, 2022

(65) Prior Publication Data

US 2023/0101960 A1 Mar. 30, 2023

(30) Foreign Application Priority Data

Sep. 30, 2021 (CN) .......................... 202111161853.X

(51) Int. Cl.
*H04N 23/54* (2023.01)
*G03B 17/56* (2021.01)
*G06F 1/16* (2006.01)
*H04N 23/50* (2023.01)
*H04N 23/695* (2023.01)

(52) U.S. Cl.
CPC ........... *H04N 23/54* (2023.01); *G03B 17/561* (2013.01); *G06F 1/1686* (2013.01); *H04N 23/50* (2023.01); *H04N 23/695* (2023.01)

(58) Field of Classification Search
CPC ... G03B 17/561; G06F 1/1616; G06F 1/1681; G06F 1/1686; H04N 23/50; H04N 23/54; H04N 23/695
USPC ........................................................ 348/373
See application file for complete search history.

(56) References Cited

U.S. PATENT DOCUMENTS

| 7,061,536 | B2 | 6/2006 | Cha |
| 10,534,408 | B2 | 1/2020 | Cheng et al. |
| 2002/0044216 | A1* | 4/2002 | Cha .................. G06F 1/1656 |
| | | | 348/376 |
| 2019/0317561 | A1* | 10/2019 | Cheng .............. G06F 1/1686 |
| 2021/0200282 | A1 | 7/2021 | Lalinde et al. |

FOREIGN PATENT DOCUMENTS

| JP | H1195865 A | 4/1999 |
| JP | 2011076267 A | 4/2011 |
| KR | 20020029616 A | 4/2002 |

OTHER PUBLICATIONS

Extended European Search Report issued in Application No. 22153445.6, dated Jul. 20, 2022,(9p).
Office Action issued to Japanese Application No. 2022-011939 dated Mar. 3, 2023 with English translation, (8p).
Office Action of Korean Application No. 10-2022-0010614 dated Dec. 14, 2023, with English translation, (14p).

* cited by examiner

*Primary Examiner* — Antoinette T Spinks
(74) *Attorney, Agent, or Firm* — Arch & Lake LLP

(57) ABSTRACT

A camera assembly is applied to a laptop and includes: a mounting bracket coupled to a display housing of the laptop and a camera unit pivotally coupled to the mounting bracket. When an opening-closing angle of the display housing relative to a keyboard housing of the laptop is greater than a first preset angle V1, an angle between an orientation of the camera unit and the keyboard housing is maintained as a second preset angle V2.

19 Claims, 3 Drawing Sheets

CAMERA ASSEMBLY, ROTATING SHAFT ASSEMBLY AND LAPTOP

CROSS-REFERENCE TO RELATED APPLICATIONS

The present disclosure claims benefit of priority to Chinese Patent Application Serial No. 202111161853.X, filed on Sep. 30, 2021, the entire contents of which are incorporated herein by reference in their entireties for all purposes.

FIELD

The present disclosure relates to the field of laptops and, more particularly, to a camera assembly, a rotating shaft assembly, and a laptop.

BACKGROUND

At present, all electronic products tend to have narrow bezels in display areas to the screen-to-body ratio, and cameras are an important factor affecting the development of narrow bezels of laptops. The laptops in the related art are generally designed with a camera on a top side of a display or on one of keycaps of a keyboard, in which the former design leads to defects of small screen-to-body ratio and poor aesthetics, and the latter design has defects of poor user experience due to a restricted angle of the camera and high design and production costs due to a complex structure of the keyboard.

SUMMARY

According to a first aspect of the present disclosure, a camera assembly applied to a laptop is provided. The laptop has a display housing and a keyboard housing. The camera assembly includes: a mounting bracket coupled to the display housing; and a camera unit pivotally coupled to the mounting bracket. In response to determining that an opening-closing angle of the display housing relative to the keyboard housing is greater than a first preset angle V1, an angle between an orientation of the camera unit and the keyboard housing is maintained as a second preset angle V2.

According to a second aspect of the present disclosure, a rotating shaft assembly is provided. The rotating shaft assembly includes a camera assembly and a rotating shaft cover. The camera assembly for use in a laptop having a display housing and a keyboard housing includes: a mounting bracket coupled to the display housing; and a camera unit pivotally coupled to the mounting bracket. In response to determining that an opening-closing angle of the display housing relative to the keyboard housing is greater than a first preset angle V1, an angle between an orientation of the camera unit and the keyboard housing is maintained as a second preset angle V2.

According to a third aspect of the present disclosure, a laptop is provided. The laptop includes: a rotating shaft assembly; a display housing; and a keyboard housing. The rotating shaft assembly includes a rotating shaft cover and a camera assembly. The display housing is coupled to the rotating shaft cover of the rotating shaft assembly; and the keyboard housing is pivotally coupled to the display housing through the rotating shaft cover. The camera assembly includes: a mounting bracket coupled to the display housing; and a camera unit pivotally coupled to the mounting bracket. In response to determining that an opening-closing angle of the display housing relative to the keyboard housing is greater than a first preset angle V1, an angle between an orientation of a camera unit of a camera assembly and the keyboard housing is maintained as a second preset angle V2.

DETAILED DESCRIPTION OF EMBODIMENTS

Embodiments will be described in detail, with examples thereof illustrated in the accompanying drawings. The embodiments described with reference to the accompanying drawings are exemplary and are intended to explain the present disclosure rather than limit the present disclosure.

Embodiments of the present disclosure provide a camera assembly, a rotating shaft assembly, and a laptop.

Figure 1:
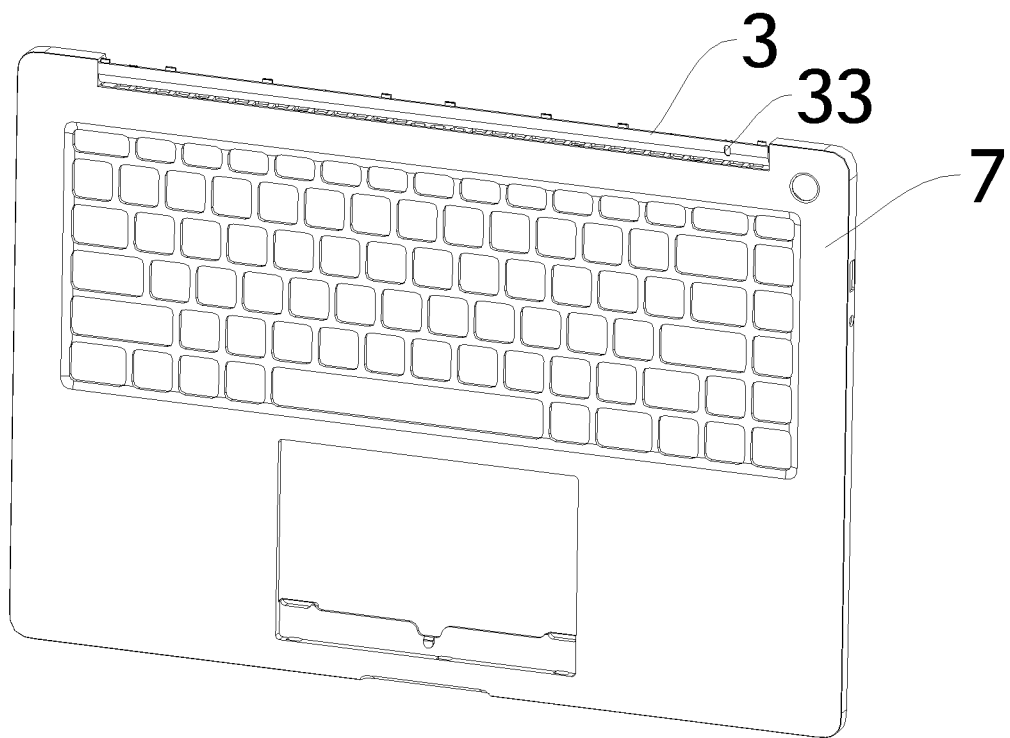
FIG. 1 is a schematic diagram of a laptop according to an embodiment of the present disclosure.
Figure 2:
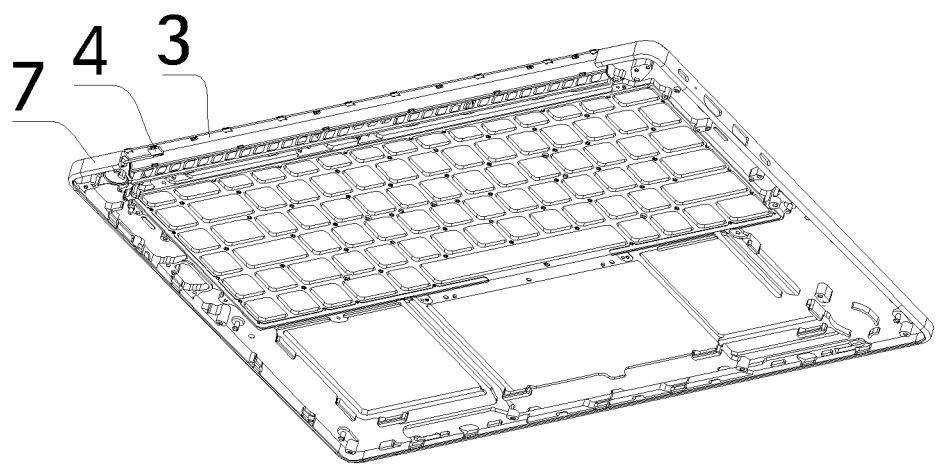
FIG. 2 is another schematic diagram of a laptop according to an embodiment of the present disclosure.
Figure 3:
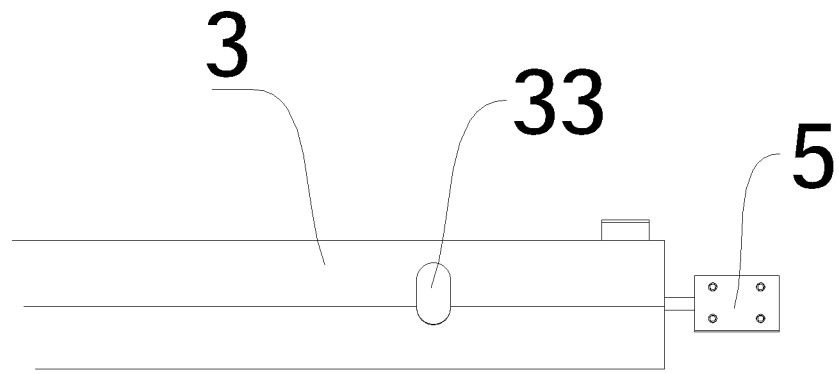
FIG. 3 is a schematic diagram of a rotating shaft assembly according to an embodiment of the present disclosure.
Figure 4:
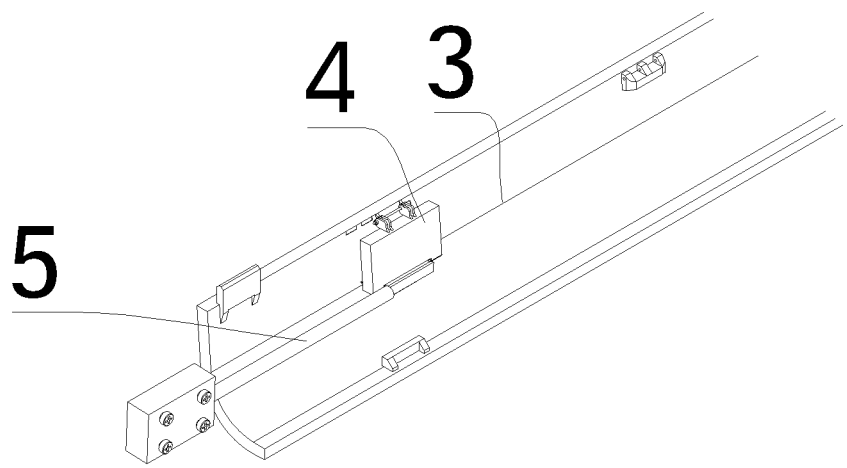
FIG. 4 is another schematic view of a rotating shaft assembly according to an embodiment of the present disclosure.

As shown in FIGS. 1 and 2, a laptop according to an embodiment of the present disclosure includes a rotating shaft assembly, a display housing 6 and a keyboard housing 5 according to an embodiment of the present disclosure. As shown in FIGS. 3 and 4, the rotating shaft assembly according to an embodiment of the present disclosure includes a camera assembly and a rotating shaft cover 1 according to an embodiment of the present disclosure.

Figure 5:
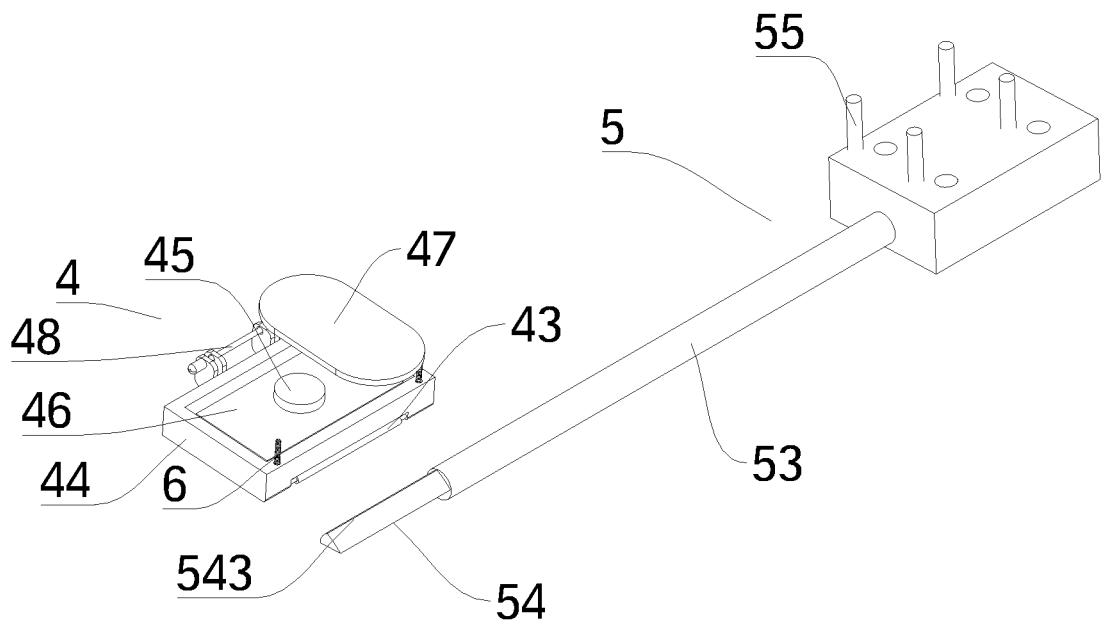
FIG. 5 is a schematic diagram of a camera assembly according to an embodiment of the present disclosure.
Figure 6:
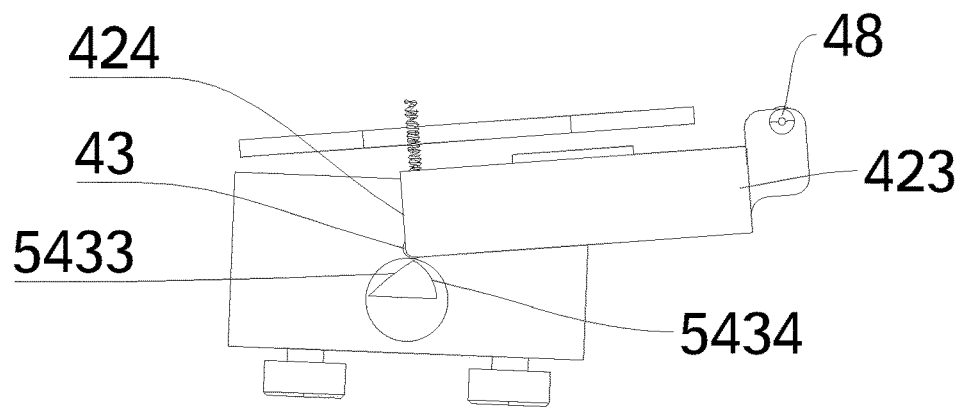
FIG. 6 is another schematic view of a camera assembly according to an embodiment of the present disclosure.
Figure 8:
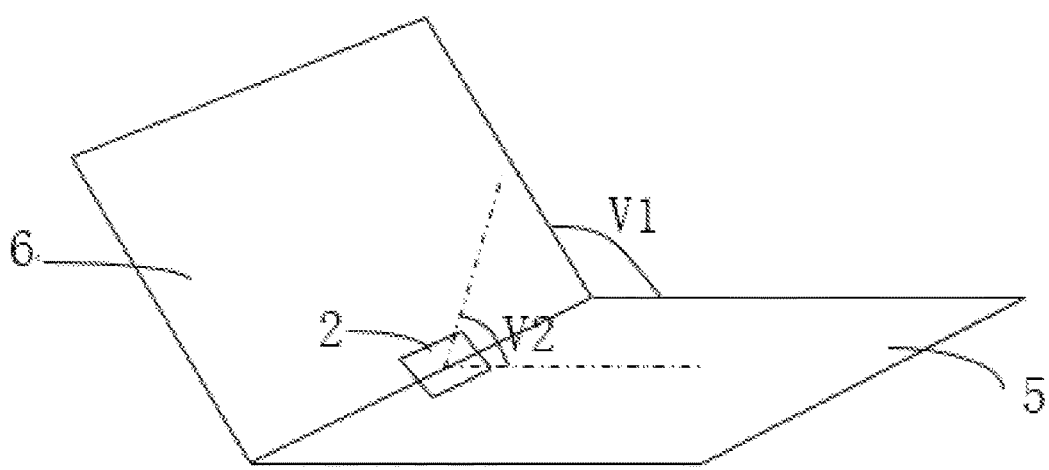
FIG. 8 is a schematic diagram illustrating a first preset angle V1 and a second preset angle V2.

As shown in FIGS. 5, 6 and 8, the camera assembly includes a mounting bracket and a camera unit 2. The mounting bracket is coupled to the display housing 6 of the laptop, and the camera unit 2 is pivotally coupled to the mounting bracket. When an opening-closing angle of the display housing 6 relative to the keyboard housing 5 of the laptop is greater than a first preset angle V1 (as shown in FIG. 8), an angle between an orientation of the camera unit 2 and the keyboard housing is maintained as a second preset angle V2 (as shown in FIG. 8).

The rotating shaft cover 1 constitutes the mounting bracket for the camera assembly, i.e., the mounting bracket is the rotating shaft cover 1 of the laptop. Alternatively, the camera assembly is located on an inner side of the rotating shaft cover 1, and the mounting bracket of the camera assembly is coupled to the rotating shaft cover 1. In other words, the mounting bracket and the rotating shaft cover 1 have a common rotation axis, and the camera unit 2 is pivotally coupled to the rotating shaft cover 1, so that the camera unit 2 and the rotating shaft cover 1 can rotate relative to each other, and the camera unit 2 can adjust its shooting direction relative to the rotating shaft cover 1. When the opening-closing angle between the display housing 6 coupled to the rotating shaft cover 1 and the keyboard housing 5 is greater than the first preset angle V1, the angle between the orientation of the camera unit 2 and the keyboard housing 5 is maintained as the second preset angle V2. The rotating shaft cover 1 is an arc-shaped plate and there is a cavity on the inner side of the rotating shaft cover 1. For example, the rotating shaft cover 1 is entirely or at least partially made of a light-transmitting material, i.e., the rotating shaft cover 1 may be entirely light-transmitting, or may be light-transmitting only at a part of the rotating shaft cover 1 corresponding to a center of the camera unit 2. An inner wall surface of the rotating shaft cover 1 and the keyboard housing 5 form a mounting cavity, or the rotating shaft cover 1 has a mounting cavity. The camera unit 2 can be arranged in the mounting cavity.

For example, a direction of rotation of the display housing 6 from a closed state (the opening-closing angle between the display housing 6 and the keyboard housing 5 is 0°) to an open state relative to the keyboard housing 5 is regarded as a clockwise direction. The clockwise rotation of the rotating shaft cover 1 (the mounting bracket) coupled to the display housing 6 can increase the opening-closing angle of the display housing 6. When the rotating shaft cover 1 rotates clockwise, and the opening-closing angle of the display housing 6 is smaller than the first preset angle V1, the camera unit 2 rotates along with the rotating shaft cover 1 around a rotation axis of the display housing 6, and the camera unit 2 remains stationary relative to the rotating shaft cover 1. When the opening-closing angle of the display housing 6 is equal to the first preset angle V1, the angle between the orientation of the camera unit 2 and the keyboard housing 5 is the second preset angle V2. When the opening-closing angle of the display housing 6 is greater than the first preset angle V1, the camera unit 2 rotates counterclockwise around a rotation axis of the camera unit 2 while the rotating shaft cover 1 continues to rotate clockwise, and at the same time, a clockwise rotation angle of the rotating shaft cover 1 is equal to a counterclockwise rotation angle of the camera unit 2 around the rotation axis of the camera unit 2. As a result, the angle between the orientation of the camera unit 2 and the keyboard housing 5 can be kept as the second preset angle V2 when the opening-closing angle of the display housing 6 is greater than the first preset angle V1.

It should be noted that the opening-closing angle of the display housing may be an angle at which the display housing rotates around the rotation axis of the display housing, but is not limited thereto.

The rotating shaft assembly according to the embodiment of the present disclosure and the camera assembly according to the embodiment of the present disclosure are fixed to the display housing 6 by the mounting bracket, and the camera unit 2 is pivotally coupled to the mounting bracket; when the opening-closing angle of the display housing 6 is greater than the first preset angle V1, the angle between the orientation of the camera unit 2 and the keyboard housing 5 is maintained as the second preset angle V2, so that the camera unit 2 can have a predetermined orientation after the mounting bracket and the display housing 6 coupled to the mounting bracket are rotated by a certain angle.

Therefore, the rotating shaft assembly according to the embodiment of the present disclosure and the camera assembly according to the embodiment of the present disclosure have the advantage that the camera unit 2 can be oriented in a preset direction after the mounting bracket is rotated by a certain angle.

The display housing 6 is coupled to the rotating shaft cover 1 of the rotating shaft assembly, and the display housing 6 is pivotally coupled to the keyboard housing 5 through the rotating shaft cover 1. As a result, when the display housing 6 is opened or closed, the display housing 6 rotates relative to the keyboard housing 5, and the rotating shaft cover 1 is driven by the display housing 6 to rotate relative to the keyboard housing 5.

When the opening-closing angle of the display housing 6 relative to the keyboard housing 5 is greater than the first preset angle V1, the angle between the orientation of the camera unit 2 of the camera assembly and the keyboard housing 5 is maintained as the second preset angle V2. The keyboard housing 5 may be substantially as a flat plate, a plane where the flat plate is may be used as a first datum surface, and there is an angle between the display housing 6 and the first datum surface when the mounting bracket is rotated.

That is, the laptop according to the embodiment of the present disclosure can allow the angle between the orientation of the camera unit 2 of the camera assembly and the keyboard housing 5 to be kept at the second preset angle V2 when the opening-closing angle of the display housing 6 relative to the keyboard housing 5 is greater than the first preset angle V1, by providing the rotating shaft assembly according to the embodiment of the present disclosure.

It should be noted that when the opening-closing angle of the display housing 6 relative to the keyboard housing 5 is greater than the first preset angle V1, a user can view a display normally. The fact that the angle between the orientation of the camera unit 2 and the keyboard housing 5 is maintained as the second preset angle V2 means that an angle between the shooting direction of the camera unit 2 and the keyboard housing 5 is V2. Moreover, when the angle between the shooting direction of the camera unit 2 and the keyboard housing 5 is V2, it is convenient for the camera unit 2 to conduct camera shooting, the user experience is excellent.

Therefore, when the user can normally view the display and adjust the opening-closing angle of the display housing 6 relative to the keyboard housing 5 according to the user's preference (e.g., the opening-closing angle of the display housing 6 is greater than the first preset angle V1), the angle between the orientation of the camera unit 2 and the keyboard housing 5 is maintained as the second preset angle V2. That is, when the user can normally view the display and rotates the display housing 6, the angle between the orientation of the camera unit 2 and the keyboard housing 5 remains unchanged, and the angle between the orientation of the camera unit 2 and the keyboard housing 5 is maintained at a value convenient for the camera unit 2 to conduct camera shooting, improving the user experience.

For the laptop according to the embodiment of the present disclosure, by arranging the camera unit 2 on the inner side of the rotating shaft cover 1 (the mounting cavity inside the rotating shaft cover 1), the angle between the orientation of the camera unit 2 and the keyboard housing 5 can be guaranteed when the user views the display. Thus, the camera unit 2 can conduct camera shooting successfully without need to be arranged on the top side, improving the screen-to-body ratio of the display and the user experience. Moreover, compared to the arrangement of the camera unit 2 on the keycap of the keyboard, the arrangement of the camera unit 2 on the inner side of the rotating shaft cover 1 is less technically difficult and has a simple structure, i.e., low design difficulty and low cost. A distance between the camera unit 2 and the user is shorter when the camera unit 2 is arranged on the keycap of the keyboard, but the position of the camera unit 2 in relation to the user is more appropriate when the camera unit 2 is arranged on the inner side of the rotating shaft cover 1, which allows a better field of view of the camera unit 2 for camera shooting and improves the user experience.

Therefore, the laptop according to the embodiment of the present disclosure has the advantages of high screen-to-body ratio, low design difficulty, low cost and excellent user experience.

As shown in FIGS. 3-6, in some embodiments, the camera assembly further includes an adjustment member 3 coupled to the camera unit 2 to facilitate driving the camera unit 2 to rotate relative to the mounting bracket. During the rotation of the mounting bracket, when the opening-closing angle of the display housing 6 is greater than the first preset angle V1, the adjustment member 3 drives the camera unit 2 to rotate around the rotation axis of the camera unit 2, and a rotation direction of the camera unit 2 is opposite to a rotation direction of the mounting bracket. At the same time, a rotation angle of the mounting bracket around the rotation axis of the display housing 6 is equal to a rotation angle of the camera unit 2 around the rotation axis of the camera unit 2, so that the angle between the orientation of the camera unit 2 and the keyboard housing 5 can be maintained as the second preset angle V2.

As shown in FIGS. 1 and 3, in some embodiments, the rotating shaft cover 1 has a through-hole 11, and the through-hole 11 penetrates the rotating shaft cover 1 and is in communication with the mounting cavity, allowing the through-hole 11 to serve as a light transmission opening of the rotating shaft cover 1. A camera 23 of the camera unit 2 is oriented towards the through-hole 11 and photographs the environment outside the rotating shaft cover 1.

The camera unit 2 of the camera assembly includes a transparent plate 25, which is bonded to the rotating shaft cover 1 and closes the through-hole 11. The transparent plate 25 is light-transmitting and closes the through-hole 11 to prevent dust and other debris from passing through the through-hole and affecting the shooting of the camera 23.

As shown in FIG. 5, in some embodiments, the adjustment member 3 includes a connection segment 31 and a camshaft segment 32, which are coupled sequentially. In some embodiments, the connection segment 31 and the camshaft segment 32 are coupled along an extension direction of the rotating shaft cover 1. The connection segment 31 is coupled to the keyboard housing 5, i.e., the camshaft segment 32 is fixed to the keyboard housing 5 along with the connection segment 31, so that the camshaft segment 32 does not move with the rotation of the display housing 6.

An axis of the camshaft segment 32, the rotation axis of the display housing 6 relative to the keyboard housing 5 and the rotation axis of the camera unit 2 relative to the mounting bracket are parallel to one another, allowing the camshaft segment 32 and the rotating shaft cover 1 to jointly change the angle between the camera unit 2 and the keyboard housing 5. In some embodiments, the rotation axis of the display housing 6 and a rotation axis of the rotating shaft cover 1 are co-linear. The camera unit 2 is pivotally coupled to the rotating shaft cover 1 by a fixing pin 26 at a first end 201 of the camera unit, and the rotation axis of the camera unit 2 is a rotation axis of the fixing pin 26.

A guide surface 321 of the camshaft segment 32 supports the camera unit 2. In some embodiments, the guide surface 321 of the camshaft segment 32 is an upper end surface of the camshaft segment 32, and the guide surface 321 of the camshaft segment 32 supports the camera unit 2 upwardly. An up-down direction is indicated by arrow A in FIG. 5.

For example, a second end 202 of the camera unit 2 is slidably coupled to the guide surface 321 of the camshaft segment 32, and the second end 202 of the camera unit 2 is opposite to the first end 201 of the camera unit 2. The fixing pin 26 at the first end 201 of the camera unit 2 is pivotally coupled to the rotating shaft cover 1, to enable the first end 201 of the camera unit 2 to rotate about the rotation axis of the display housing 6 as the rotating shaft cover 1 rotates. During the movement of the first end 201 of the camera unit 2, the second end 202 of the camera unit 2 slides on the guide surface 321 of the camshaft segment 32, that is, the guide surface 321 of the camshaft segment 32 can limit a movement trajectory of the second end 202 of the camera unit 2. Thus, when the opening-closing angle of the display housing 6 is greater than the first preset angle V1, the adjustment member 3 can drive the camera unit 2 to rotate relative to the rotating shaft cover 1, maintaining the angle between the orientation of the camera unit 2 and the keyboard housing 5 at the second preset angle V2. The adjustment member 3 has a simple structure and is easier to arrange by providing the connection segment 31 and the camshaft segment 32.

As shown in FIG. 6, in some embodiments, the guide surface 321 includes a first guide surface 3211 and a second guide surface 3212 coupled sequentially.

A central axis of the first guide surface 3211 is co-linear with the rotation axis of the display housing 6, and the first guide surface 3211 is coupled to the camera unit 2 when the display housing 6 rotates around the rotation axis of the display housing 6 and the rotation angle is smaller than the first preset angle V1. The first guide surface 3211 is a circular arc surface, and it is readily understood that a central axis of an arc surface formed by a trajectory of movement of the first end 201 of the camera unit 2 on the first guide surface 3211 is also co-linear with the rotation axis of the display housing 6 when the display housing 6 is rotated around the rotation axis of the display housing 6 relative to the keyboard housing 5. That is, when the camera unit 2 is rotated along the first guide surface 3211, a radian by which the camera unit 2 rotates along the first guide surface 3211 is equal to a radian by which the display housing 6 rotates around the rotation axis of the display housing 6. Thus, when the display housing 6 is rotated relative to the keyboard housing 5 around the rotation axis of the display housing 6 to drive the second end 202 of the camera unit 2 to move relative to the first guide surface 3211, the camera unit 2 is supported by the first guide surface 3211 and will not rotate relative to the display housing 6, and the camera unit 2 is stationary relative to the display housing 6, i.e., the angle between the orientation of the camera unit 2 and the keyboard housing 5 changes constantly.

When the display housing 6 rotates relative to the keyboard housing 5 around the rotation axis of the display housing 6 up to the first preset angle V1, the angle between the orientation of the camera unit 2 and the keyboard housing 5 reaches the second preset angle V2. In such a case, the second end 202 of the camera unit 2 moves to a joint of the first guide surface 3211 and the second guide surface 3212.

When the display housing 6 rotates around the rotation axis of the display housing 6 and the rotation angle is greater than the first preset angle V1, the second guide surface 3212 supports the camera unit 2, and the center of the camera unit 2 rotates around the rotation axis of the camera unit 2 by an angle equal to the rotation angle of the display housing 6 around the rotation axis of the display housing 6. The rotation axis of the camera unit 2 is a central axis of the fixing pin.

As shown in FIG. 6, the second guide surface 3212 is a curved surface, and as the camera unit 2 rotates along the second guide surface 3212, an arc line along which the camera unit 2 rotates along the second guide surface 3212 satisfies: an angle at which the center of the camera unit 2 rotates around the rotation axis of the camera unit 2 is equal to an angle at which the display housing 6 rotates around the rotation axis of the display housing 6.

Figure 7:
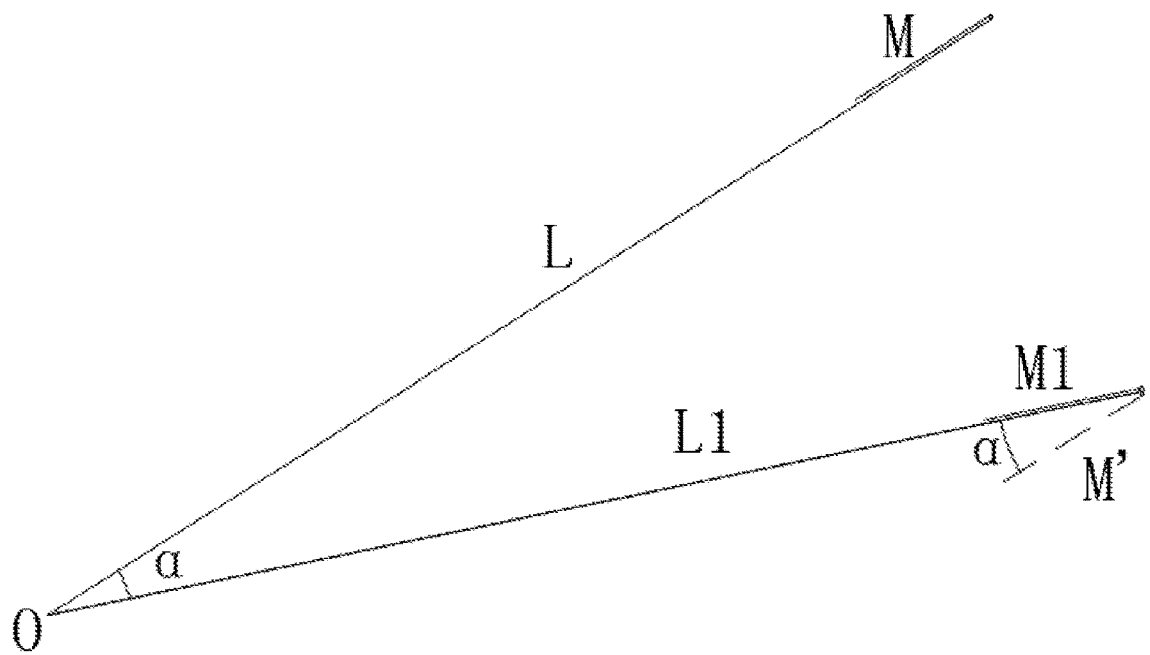
FIG. 7 is a schematic diagram illustrating rotation of a display housing and a camera unit about a rotation axis of the display housing according to an embodiment of the present disclosure.

A rotation axis of each segment of the arc of the second guide surface 3212 and a rotation axis of the first guide surface 3211 are parallel to each other and are not co-linear. As the display housing 6 continues to rotate relative to the keyboard housing 5 around the rotation axis of the display housing 6 and the second end 202 of the camera unit 2 begins to move on the second guide surface 3212, the camera unit 2 rotates relative to the display housing 6. When the display housing 6 rotates relative to the keyboard housing 5 around the rotation axis of the display housing 6 by an angle greater than the first preset angle V1 and continues to rotate, its moving state is shown in FIG. 7, in which 0 represents the rotation axis of the display housing 6; L and L1 represent two positions of the display housing 6 before and after the display housing 6 rotates by an angle α, respectively; M and M1 represent two positions of the camera unit 2 before and after the camera unit rotates by the angle α, respectively; and M' and M are parallel to each other. That is, when the rotation angle of the display housing 6 relative to the keyboard housing 5 around the rotation axis of the display housing 6 is greater than the first preset angle V1, it is only necessary to ensure that a rotation angle of the center of the camera of the camera unit 2 around the fixing pin 26 at the first end 201 is equal to the rotation angle of the display housing 6 (the fixing pin 26 at the first end 201) around the rotation axis of the display housing 6 in the same time, which allows the angle between the orientation of the unit 2 and the keyboard housing 5 to be maintained at the second preset angle V2.

As shown in FIG. 5, in some embodiments, the camera unit 2 is provided with a roller 21, and the camera unit 2 is in rolling cooperation with the guide surface 321 through the roller 21. In some embodiments, the roller 21 is rotatably arranged at a lower part of the second end 202 of the camera unit 2, so that the roller 21 can be in rolling cooperation with the guide surface 321, reducing the wear of the camera unit 2 and improving the accuracy of the orientation of the camera unit 2.

As shown in FIG. 5, in some embodiments, the connection segment 31 is threadedly coupled to the keyboard housing 5 by means of a threaded member 33. In some embodiments, an end of the connection segment 31 away from the camshaft segment 32 is a connection plate, and the connection plate has four connection holes, the keyboard housing 5 has four threaded holes, and the threaded member 33 is a bolt. Four bolts pass through the corresponding connection holes and are in thread fit with the corresponding threaded holes, facilitating connection between the connection segment and the keyboard housing 5.

As shown in FIG. 5, in some embodiments, the laptop also includes an elastic member 4 that couples the rotating shaft cover 1 to the camera unit 2, and the elastic member 4 is used to press the camera unit 2 against the guide surface 321. In some embodiments, the elastic member 4 presses the camera unit 2 downwardly toward the camshaft segment 32, making the camera unit 2 more stable when moving along the guide surface 321 of the camshaft segment 32, and avoiding shaking of the camera unit 2 to ensure its use performance.

As shown in FIG. 5, in some embodiments, the elastic member includes a spring 4 having a first end coupled to the camera unit 2 and a second end coupled to the rotating shaft cover 1. For example, a lower end of the spring 4 is coupled to the camera unit 2 and an upper end of the spring 4 is coupled to the rotating shaft cover 1, such that the spring 4 can use its own elasticity to press the camera unit 2 downwardly toward the camshaft segment 32.

Alternatively, the elastic member may be a torsion spring fitted over the fixing pin.

As shown in FIG. 5, in some embodiments, the camera unit 2 includes a holding box 22, a camera 23, and a control board 24. For example, the holding box 22 has a groove with an upward opening, and the camera 23 and the control board 24 are arranged in sequence from top to bottom in the groove of the holding box 22. The holding box 22 is pivotally coupled to the rotating shaft cover 1. In some embodiments, the fixing pin 26 on the holding box 22 is pivotally coupled to the rotating shaft cover 1, and the camera unit 2 is pivotally coupled to the rotating shaft cover 1. The camera 23 is mounted on the control board 24, and the control board 24 is bonded in the holding box 22 by a double-sided adhesive, so that the camera 23 and the control board 24 can be fixed in the holding box 22.

In some embodiments, the first preset angle V1 ranges from 90° to 100° and the second preset angle V2 ranges from 65° to 75°. That is, when the opening-closing angle of the display housing 6 is greater than the first preset angle)(90°-100°, the adjustment member 3 can drive the camera unit 2 to rotate relative to the rotating shaft cover 1, to maintain the angle between the orientation of the camera unit 2 and the keyboard housing 5 at the second preset angle)(65°-75°. When the opening-closing angle of the display housing 6 is greater than the first preset angle)(90°-100°, the user can view the display normally. When the angle between the camera orientation of the camera unit 2 and the keyboard housing 5 is 65°-75°, it is easy for the camera unit 2 to conduct camera shooting and the user experience is excellent.

In some embodiments, the first preset angle V1 is 90° and the second preset angle V2 is 70°. The opening-closing angle of the display housing 6 reaches at least 90°, which is suitable for most users to view the display normally. When the angle between the shooting direction of the camera unit 2 and the keyboard housing 5 is 70°, the camera unit 2 can conduct the camera shooting easily, which satisfies the shooting needs of most users.

In the description of the present disclosure, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These terms are for convenience of description and do not indicate or imply that that the device or element referred to must have a particular orientation or be constructed and operated in a particular orientation. Thus, these terms shall not be construed as limitation on the present disclosure.

In addition, terms such as "first" and "second" are used herein for purposes of description and are not intended to indicate or imply relative importance or the number of indicated technical features. Thus, the feature defined with "first" and "second" may include one or more this feature.

In the description of the present disclosure, "a plurality of" means at least two (e.g., two or three), unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also communicate with each other; may also be direct connections or indirect connections via intervening structures; may also be inner connection or mutual interaction of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "one embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Moreover, different embodiments or examples as well as features in different embodiments or examples may be combined or integrated by those skilled in the art, on the premise of no conflict.

Although embodiments of the present disclosure have been shown and described, it would be appreciated that the above embodiments are exemplary and cannot be construed to limit the present disclosure, and changes, modifications, alternatives and variations can be made in the embodiments without departing from the scope of the present disclosure.

What is claimed is:

1. A laptop, comprising a display housing, a keyboard housing, and a camera assembly, wherein the camera assembly comprises:
    a mounting bracket coupled to the display housing;
    a camera unit pivotally coupled to the mounting bracket; and
    an adjustment member coupled to the keyboard housing and comprising a connection segment and a camshaft segment coupled sequentially, wherein the connection segment is coupled to the keyboard housing,
    wherein an axis of the camshaft segment, a rotation axis of the display housing relative to the keyboard housing, and a rotation axis of the camera unit relative to the mounting bracket are parallel to one another;
    a guide surface of the camshaft segment supports the camera unit, and the camera unit is movable relative to the guide surface;
    the guide surface comprises a first guide surface and a second guide surface coupled sequentially;
    in response to determining that an opening-closing angle of the display housing relative to the keyboard housing is smaller than a first preset angle V1, the first guide surface supports the camera unit, and the camera unit rotates along the first guide surface in a same direction as a rotation direction of the mounting bracket; and
    in response to determining that the opening-closing angle of the display housing relative to the keyboard housing is greater than the first preset angle V1, the second guide surface supports the camera unit, and the camera unit rotates along the second guide surface in an opposite direction to the rotation direction of the mounting bracket, to allow an angle between an orientation of the camera unit and the keyboard housing to be maintained as a second preset angle V2.

2. The laptop according to claim 1, wherein the adjustment member drives the camera unit to rotate relative to the mounting bracket in response to determining that the opening-closing angle of the display housing relative to the keyboard housing of the laptop is greater than the first preset angle V1.

3. The laptop according to claim 1, wherein: a central axis of the first guide surface is co-linear with the rotation axis of the display housing; and a center of the camera unit rotates around the rotation axis of the camera unit by an angle equal to a rotation angle of the display housing around the rotation axis of the display housing.

4. The laptop according to claim 3, wherein:
    the first guide surface is a circular arc surface, and in response to determining that the camera unit rotates along the first guide surface, a radian by which the camera unit rotates along the first guide surface is equal to a radian by which the display housing rotates around the rotation axis of the display housing; and
    the second guide surface is a curved surface, and in response to determining that the camera unit rotates along the second guide surface, an arc line along which the camera unit rotates along the second guide surface satisfies: an angle at which the center of the camera unit rotates around the rotation axis of the camera unit is equal to an angle at which the display housing rotates around the rotation axis of the display housing.

5. The laptop according to claim 3, wherein a rotation axis of each segment of an arc of the second guide surface and a rotation axis of the first guide surface are parallel to each other and are non-collinear.

6. The laptop according to claim 1, wherein the camera unit comprises a roller, and the camera unit is in rolling cooperation with the guide surface through the roller.

7. The laptop according to claim 1, wherein the connection segment is threadedly coupled to the keyboard housing by a threaded member.

8. The laptop according to claim 1, wherein the laptop further comprises an elastic member, and the elastic member couples the mounting bracket to the camera unit and presses the camera unit against the guide surface.

9. The laptop according to claim 8, wherein the elastic member comprises a spring comprising a first end coupled to the camera unit and a second end coupled to the mounting bracket.

10. The laptop according to claim 1, wherein the camera unit comprises:

a holding box pivotally coupled to the mounting bracket;
a control board bonded in the holding box; and
a camera mounted on the control board.

11. The laptop according to claim 1, wherein the first preset angle V1 ranges from 90° to 100°, and the second preset angle V2 ranges from 65° to 75°.

12. The laptop according to claim 10, wherein the first preset angle V1 is 90° and the second preset angle V2 is 70°.

13. A rotating shaft assembly, comprising:
a rotating shaft cover; and
a camera assembly for use in a laptop comprising a display housing and a keyboard housing, the camera assembly comprising:
a mounting bracket coupled to the display housing;
a camera unit pivotally coupled to the mounting bracket; and
an adjustment member coupled to the keyboard housing and comprising a connection segment and a camshaft segment coupled sequentially, wherein the connection segment is coupled to the keyboard housing,
wherein an axis of the camshaft segment, a rotation axis of the display housing relative to the keyboard housing, and a rotation axis of the camera unit relative to the mounting bracket are parallel to one another;
a guide surface of the camshaft segment supports the camera unit, and the camera unit is movable relative to the guide surface;
the guide surface comprises a first guide surface and a second guide surface coupled sequentially;
in response to determining that an opening-closing angle of the display housing relative to the keyboard housing is smaller than a first preset angle V1, the first guide surface supports the camera unit, and the camera unit rotates along the first guide surface in a same direction as a rotation direction of the mounting bracket; and
in response to determining that the opening-closing angle of the display housing relative to the keyboard housing is greater than the first preset angle V1, the second guide surface supports the camera unit, and the camera unit rotates along the second guide surface in an opposite direction to the rotation direction of the mounting bracket, to allow an angle between an orientation of the camera unit and the keyboard housing to be maintained as a second preset angle V2.

14. The rotating shaft assembly according to claim 13, wherein the mounting bracket of the camera assembly consists of the rotating shaft cover.

15. The rotating shaft assembly according to claim 13, wherein the camera assembly is arranged on an inner side of the rotating shaft cover, and the mounting bracket of the camera assembly is coupled to the rotating shaft cover.

16. The rotating shaft assembly according to claim 13, wherein:
the rotating shaft cover comprises a through-hole;
the camera unit of the camera assembly comprises a transparent plate; and
the transparent plate is bonded to the rotating shaft cover and closes the through-hole.

17. The rotating shaft assembly according to claim 13, wherein the rotating shaft cover is made of a light-transmitting material.

18. The rotating shaft assembly according to claim 13, wherein the camera unit comprises:
a holding box comprising a groove with an upward opening and pivotally coupled to the rotating shaft cover;
a control board bonded in the holding box; and
a camera mounted on the control board.

19. A laptop, comprising:
a rotating shaft assembly comprising a rotating shaft cover and a camera assembly;
a display housing coupled to the rotating shaft cover of the rotating shaft assembly; and
a keyboard housing pivotally coupled to the display housing through the rotating shaft cover,
wherein:
the camera assembly comprises: a mounting bracket coupled to the display housing;
a camera unit pivotally coupled to the mounting bracket; and an adjustment member coupled to the keyboard housing and comprising a connection segment and a camshaft segment coupled sequentially, wherein the connection segment is coupled to the keyboard housing,
wherein an axis of the camshaft segment, a rotation axis of the display housing relative to the keyboard housing, and a rotation axis of the camera unit relative to the mounting bracket are parallel to one another;
a guide surface of the camshaft segment supports the camera unit, and the camera unit is movable relative to the guide surface;
the guide surface comprises a first guide surface and a second guide surface coupled sequentially;
in response to determining that an opening-closing angle of the display housing relative to the keyboard housing is smaller than a first preset angle V1, the first guide surface supports the camera unit, and the camera unit rotates along the first guide surface in a same direction as a rotation direction of the mounting bracket; and
in response to determining that the opening-closing angle of the display housing relative to the keyboard housing is greater than the first preset angle V1, the second guide surface supports the camera unit, and the camera unit rotates along the second guide surface in an opposite direction to the rotation direction of the mounting bracket, to allow an angle between an orientation of the camera unit and the keyboard housing to be maintained as a second preset angle V2.

\* \* \* \* \*